United States Patent
Sakai et al.

(10) Patent No.: US 9,946,239 B2
(45) Date of Patent: Apr. 17, 2018

(54) FURNACE CONTROL BOARD ARCHITECTURE

(71) Applicant: Lennox Industries Inc., Richardson, TX (US)

(72) Inventors: Takeshi Sakai, Plano, TX (US); Michael Engler, Lucas, TX (US); Stephen J. Vendt, Lewisville, TX (US)

(73) Assignee: Lennox Industries Inc., Richardson, TX (US)

( * ) Notice: Subject to any disclaimer, the term of this patent is extended or adjusted under 35 U.S.C. 154(b) by 422 days.

(21) Appl. No.: 14/843,620

(22) Filed: Sep. 2, 2015

(65) Prior Publication Data
US 2017/0059192 A1  Mar. 2, 2017

(51) Int. Cl.
G05B 15/02 (2006.01)
F24F 11/00 (2018.01)

(52) U.S. Cl.
CPC .......... *G05B 15/02* (2013.01); *F24F 11/0086* (2013.01)

(58) Field of Classification Search
None
See application file for complete search history.

(56) References Cited

U.S. PATENT DOCUMENTS

2006/0130496 A1* 6/2006 Chapman ............. F24F 11/0086
62/126

* cited by examiner

Primary Examiner — Cheung Lee
(74) Attorney, Agent, or Firm — Baker Botts L.L.P.

(57) ABSTRACT

A system and method are disclosed that provide for a dual processor architecture in a furnace or HVAC controller. One processor can control non-safety-critical components and is operable to receive software updates. The other processor can control safety-critical components and is not capable of being updated. Safety-critical components can comprise a flame sensor, gas valve and an igniter.

20 Claims, 17 Drawing Sheets

FURNACE CONTROL BOARD ARCHITECTURE

TECHNICAL FIELD

The present disclosure is directed to HVAC systems and more particularly to control boards and processors for furnaces.

BACKGROUND OF THE INVENTION

HVAC systems comprise various interworking components: furnaces, heat exchanger, pipes, ducts and more. Often an HVAC system will comprise at least two control boards. One controller will be a central controller, with a processor directing the activity of the entire system. A furnace will usually have its own separate controller and processor. The central controller and the furnace controller will often be networked together, either by a line or wireless. The central controller will often have a connection to a monitoring or central station. This can be via the local internet connection, cellular or another method.

As it has become easier to monitor HVAC systems from a remote location it has also become desirable to add or change functionality in an installed system. Users would like to turn on/off a system remotely (such as via a mobile application) and manufacturers would like to be able to monitor the systems. All of this functionality requires software and capable processors on the central and furnace controllers. Because software is used there will sometimes be a need to update that software or other functionality of the controllers. However, some elements of HVAC systems, especially furnace functionalities, must pass onerous safety certifications, such as CSA (Canadian Standards Association) or OSHA (Occupational Safety & Health Administration) certifications. A controller that goes through a software update may lose certification.

BRIEF SUMMARY OF THE INVENTION

One embodiment of the present invention comprises a controller board for a furnace comprising: a communication interface comprising a connection to a central HVAC controller; an application processor comprising a memory; a safety processor comprising a memory and a connection to a flame sensor, a gas valve, and an igniter; and an interprocessor interface comprising a connection between the application processor and the safety processor.

Another embodiment comprises a controller board for an HVAC system comprising: a communication interface operable to communicate with a plurality of servers; a connection to a thermostat; an application processor comprising a memory and operable to receive a software update from the plurality of servers; a safety processor comprising a memory and a connection to a flame sensor, a gas valve, and an igniter; and an interprocessor interface comprising a connection between the application processor and the safety processor.

Another embodiment comprises a method of manufacturing a furnace controller for an HVAC system comprising: providing a controller board; providing an application processor, the application processor comprising a memory and a connection to a central HVAC controller, the application processor operable to receive a software update; providing a safety processor, the safety processor comprising a memory and a connection to a flame sensor, a gas valve, and an igniter; and providing an interprocessor interface comprising a connection between the application processor and the safety processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The present teachings can comprise a dual controller architecture for furnace controllers in HVAC systems. Furnace controllers, because of the safety risks associated with their functioning, have to go through safety certifications, such as by CSA. If a software update is applied to the controller, then a safety certification will likely be lost. A manufacturer can try to recertify but this would be time consuming and expensive. The result is that manufacturers tend to not issue software updates. As a solution, the present disclosure includes embodiments where a primary processor can be used to manage non-safety-critical functionality in a furnace and a safety processor can be used to manage safety-critical functionality. This embodiment allows updates to be applied to the primary processor while safety-critical functionalities are untouched and maintain safety certification. This will allow manufacturers to add and improve system functionality while the safety functions are left unaffected.

Figure 1:
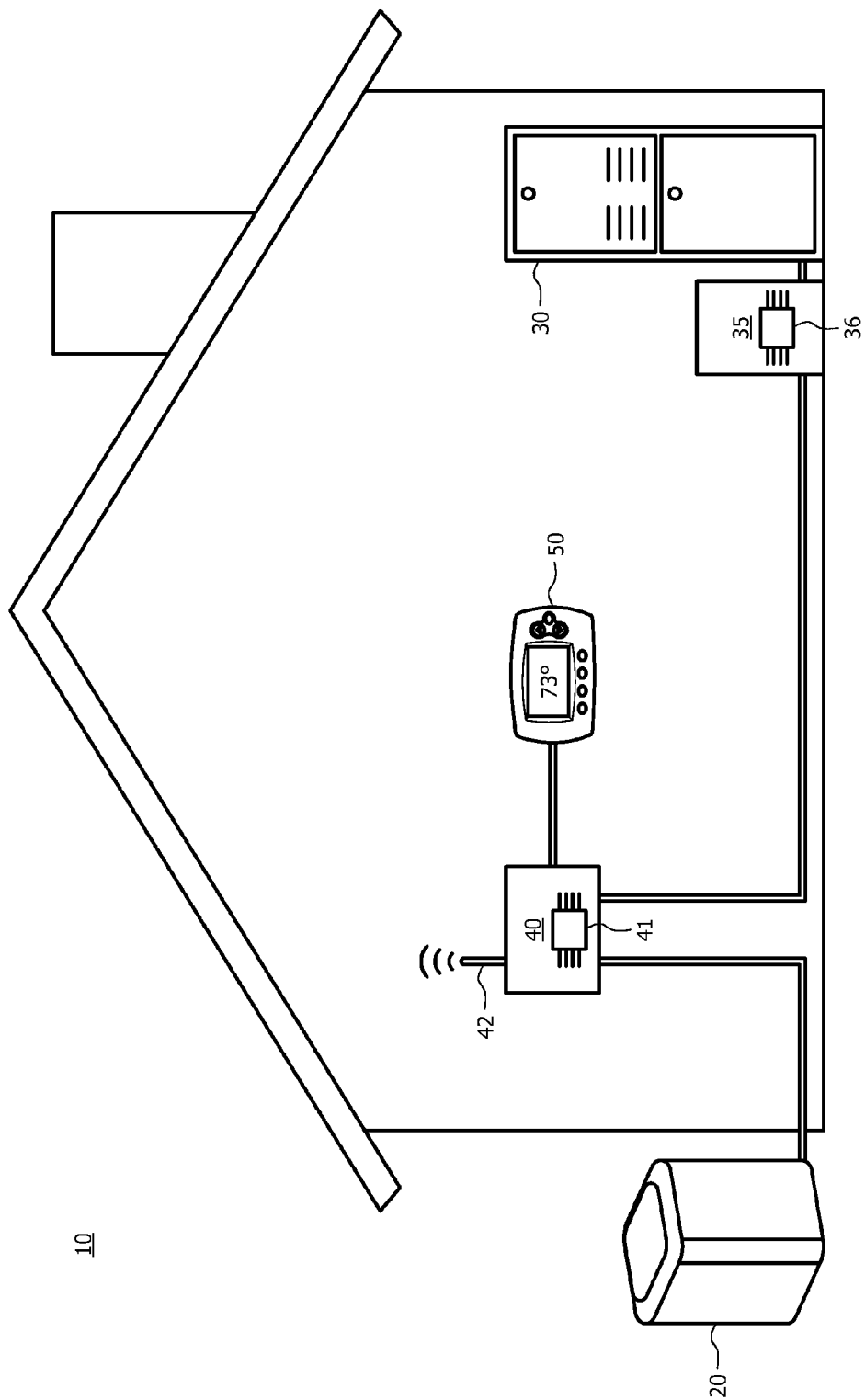
FIG. 1 is a diagram of a prior art embodiment of an HVAC system.

Referring now to FIG. 1, a prior art HVAC system is shown. The system 10 shown is residential and comprises an A/C unit 20, furnace 30, furnace controller 35, central controller 40 and thermostat interface 50. Furnace controller 35 comprises a single processor 36 and central controller comprises a single processor 41. Central controller 40 also comprises a communication interface 42 which can be wireless or wired. Interface 42 allows central controller to communicate with a central station or other functionality. Central controller connects to all the elements of system 10. As shown, an HVAC company could send/push an update to system 10 and to central controller 40 and furnace controller 35. However, furnace controller 35 likely had to pass industry safety certifications prior to sale or installation. An update to furnace controller 35 and its processor 36 would void the certification. Recertifying would be an arduous process.

Figure 2:
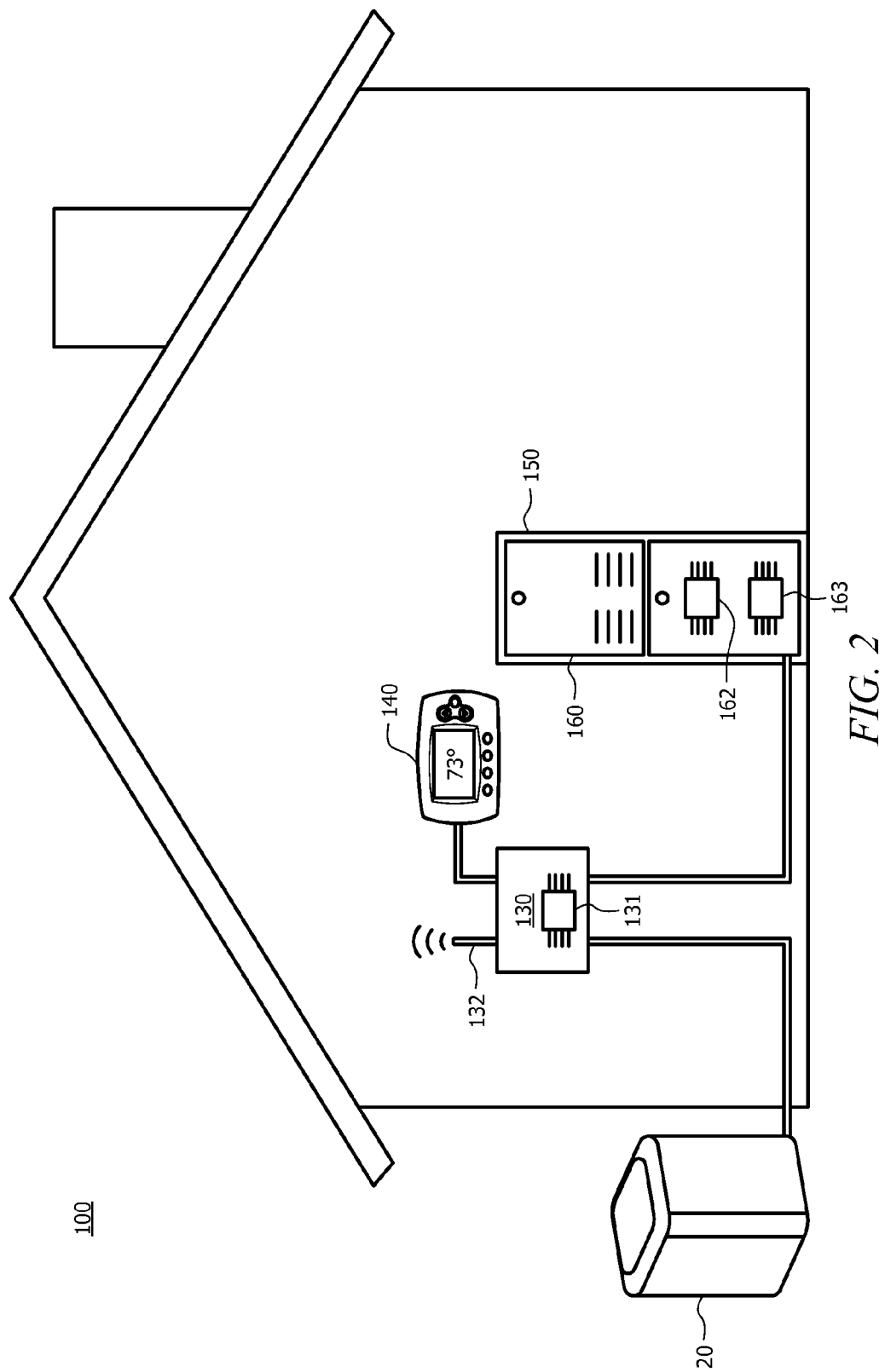
FIG. 2 is a diagram of a system embodiment of the present disclosure.

An embodiment of the present disclosure is shown in FIG. 2. Central controller 130 manages the HVAC system 100 and is in communication with a thermostat 140, furnace 150, and an A/C unit (not shown). Central controller 130 is in communication with furnace 150 by means of furnace controller 160. Furnace controller comprises an application processor 162 and safety processor 163. Safety critical functions of furnace 150 will be run through safety processor 163, such as the igniter, gas valve, and flame sensor. Other functionality of the furnace will run through application processor 162 such as humidifiers, thermostats, and air sensors. Furnace controller 160 and central controller 130 can communicate with a remote server/central station/etc. by means of a communications interface 132, which can be wireless or wired. Central controller 130 and furnace controller 160 can receive commands such as turn off/on, temperature settings, or other settings via interface 132. Controllers 130, 160 can also receive software updates. However, only application processor 162 of furnace controller 160 can be updated. Safety processor 163 is not set up to allow updates.

Figure 3:
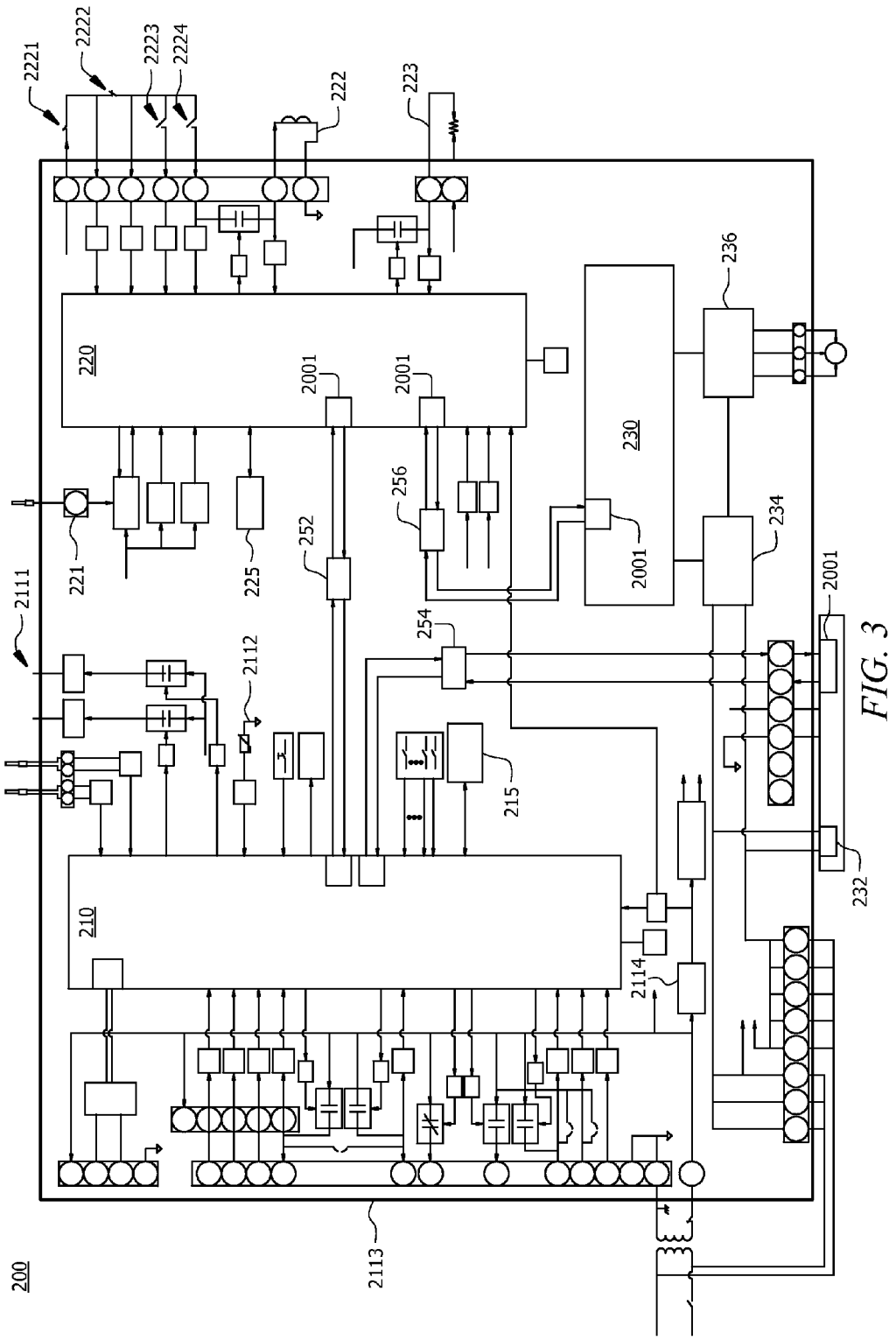
FIG. 3 is a diagram of a controller board embodiment of the present disclosure.
Figure 3A:
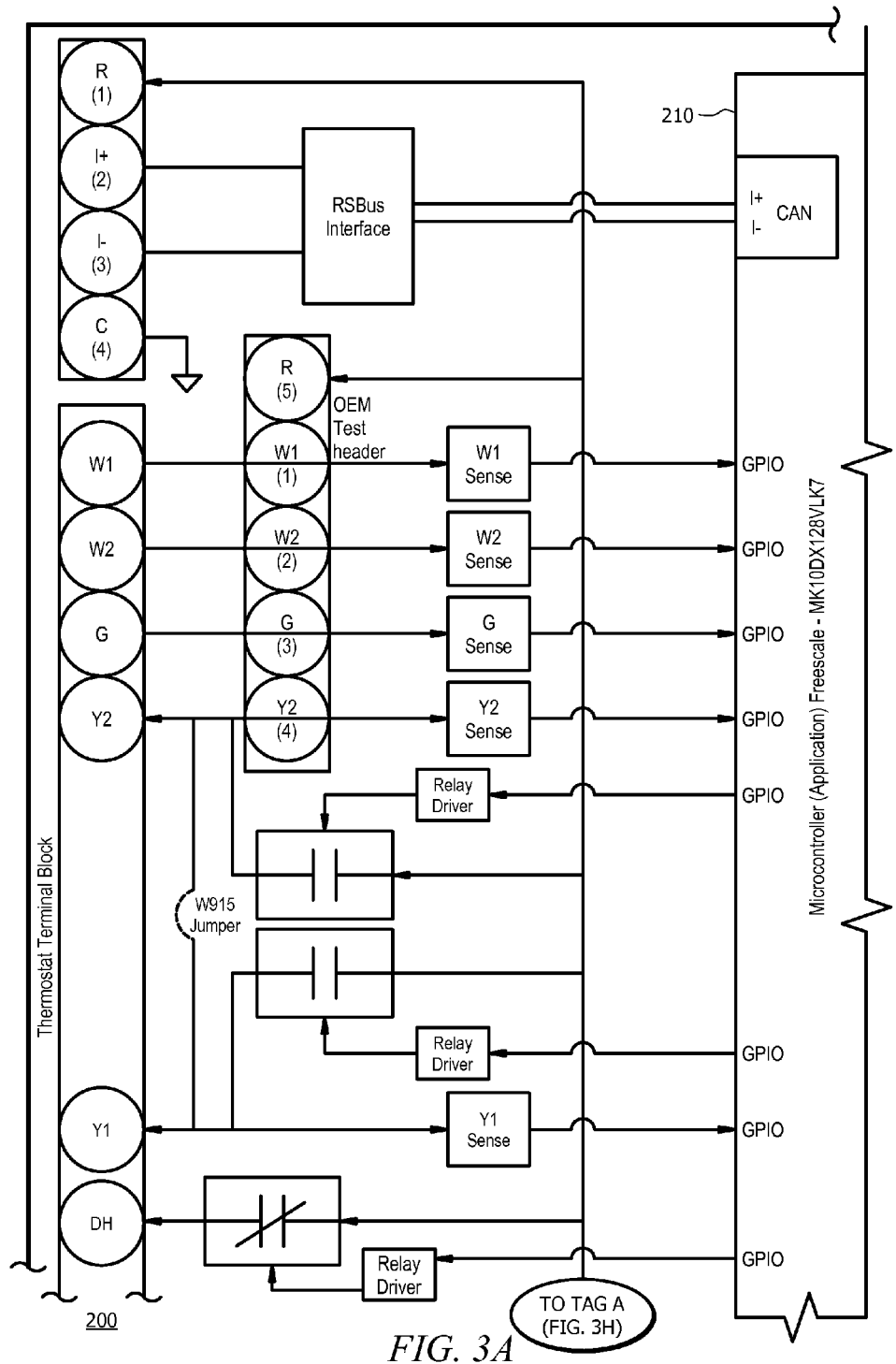
FIGS. 3A-3J are detailed views of the controller board embodiment of FIG. 3.
Figure 3B:
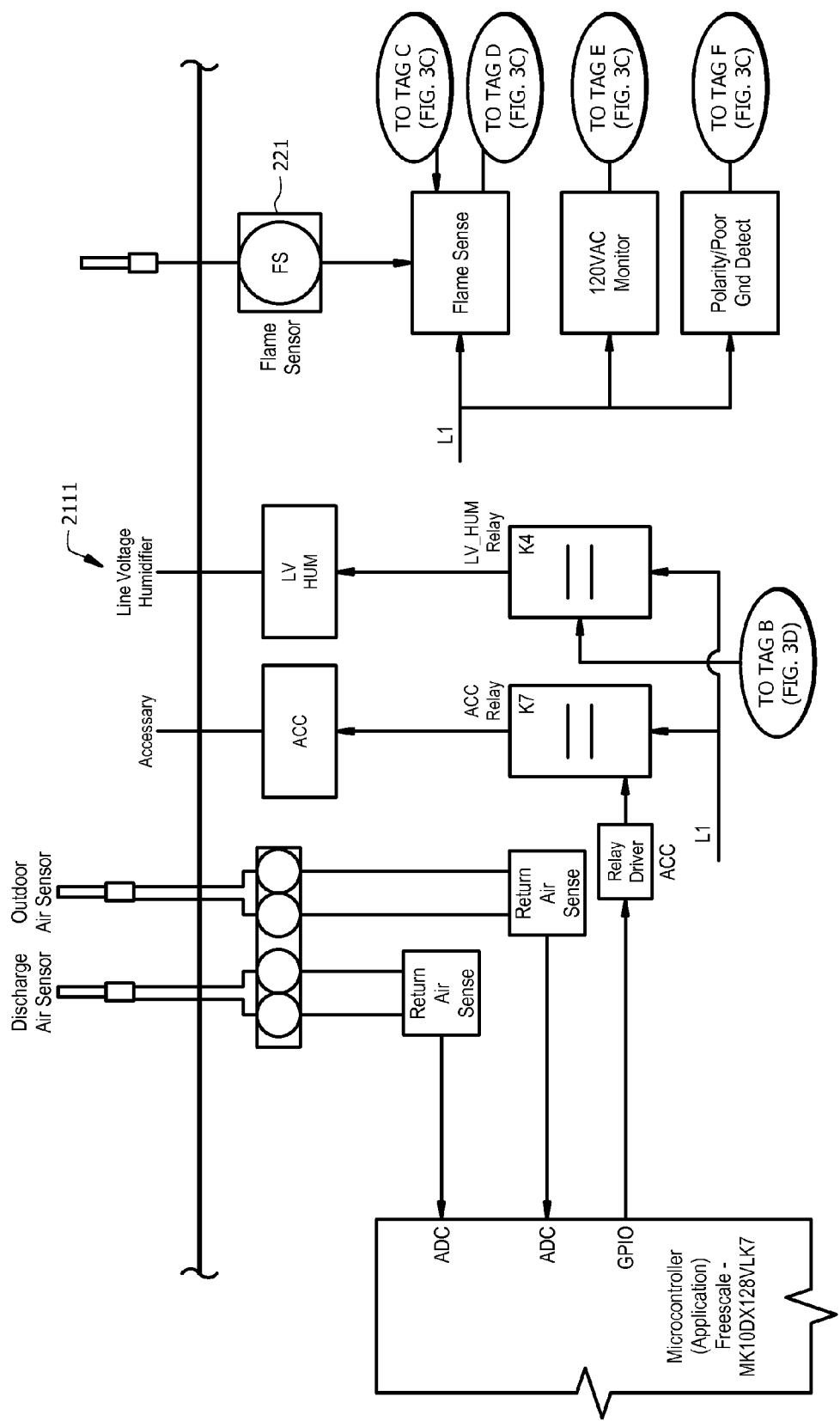
Figure 3C:
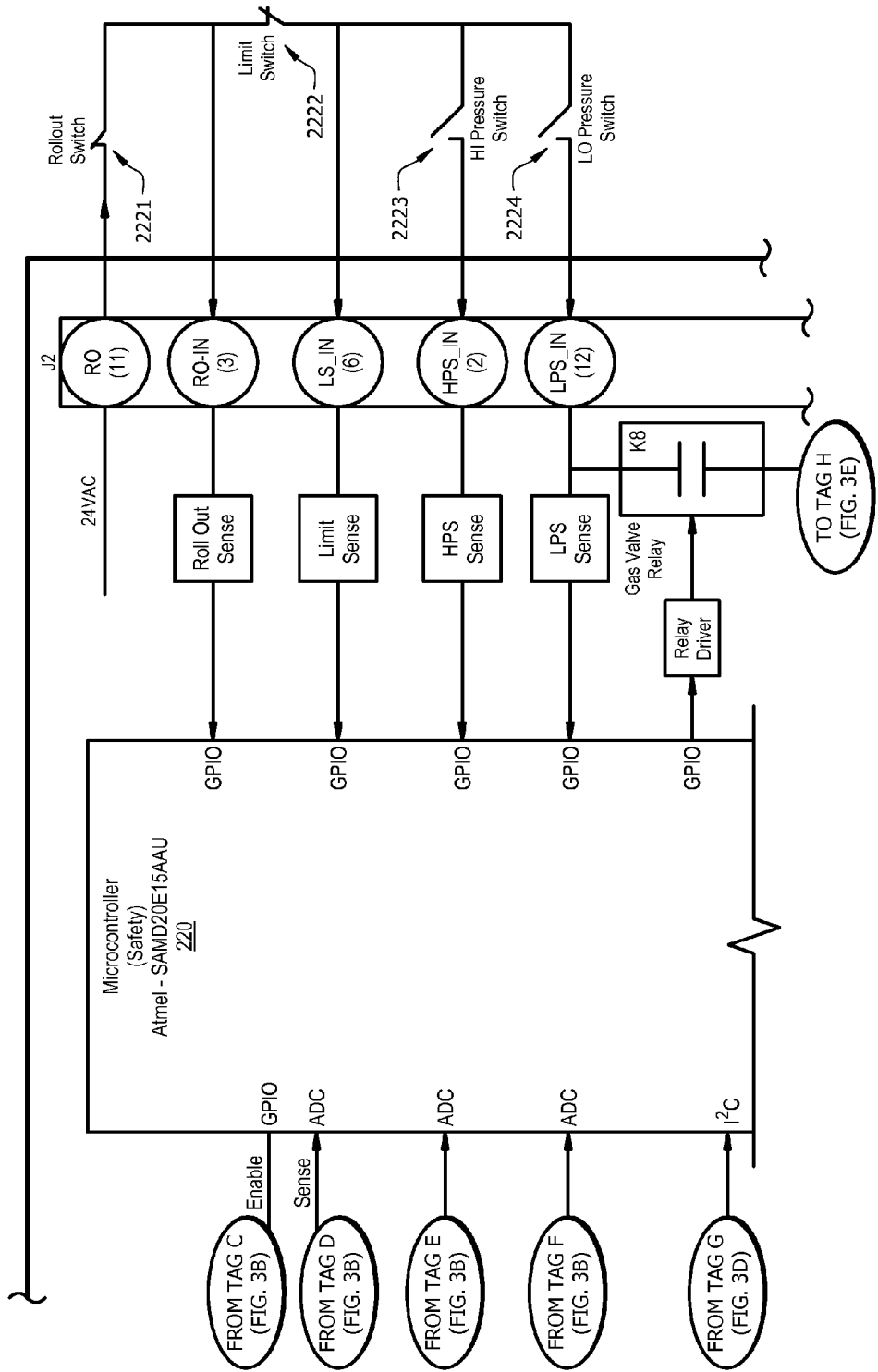
Figure 3D:
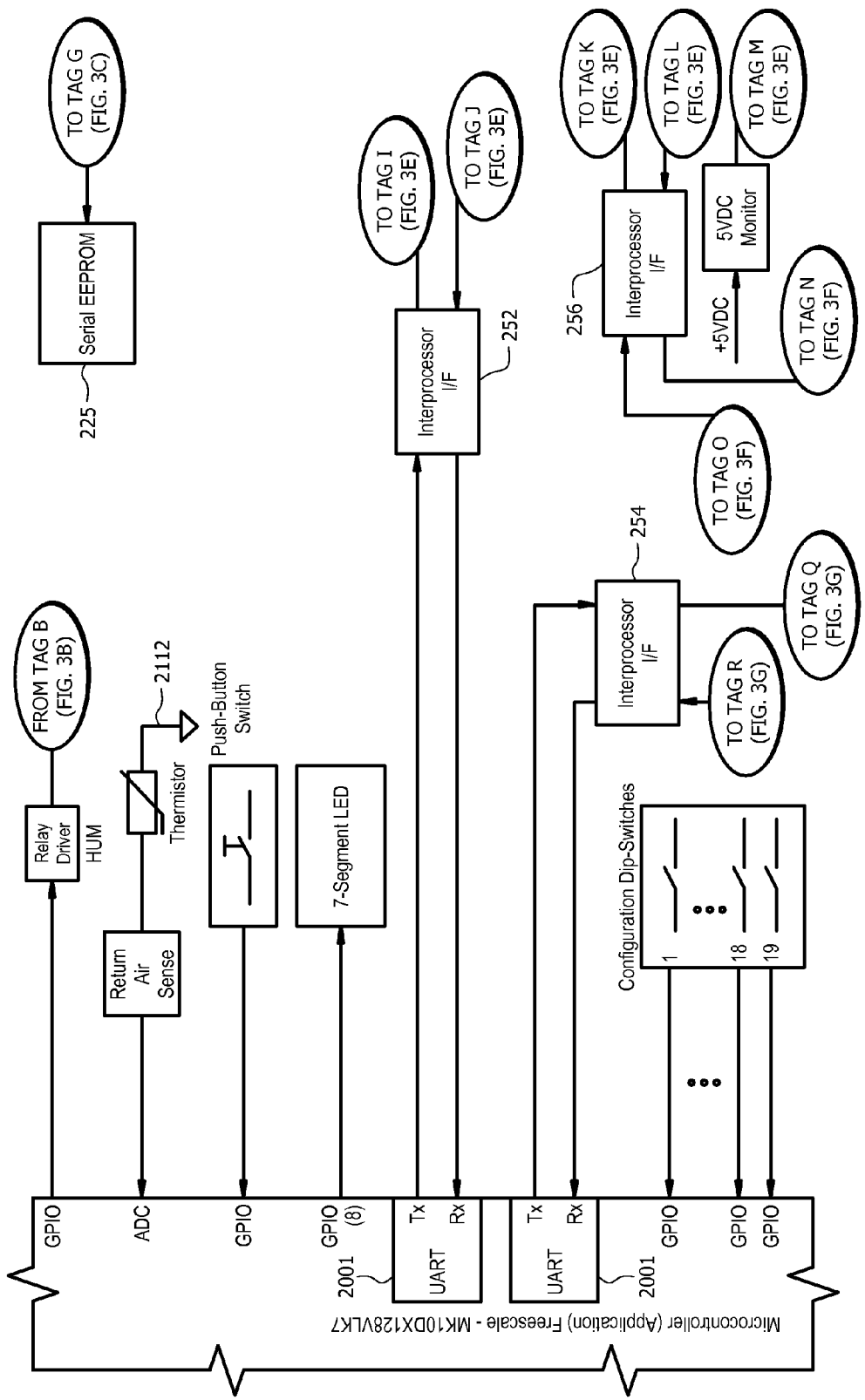
Figure 3E:
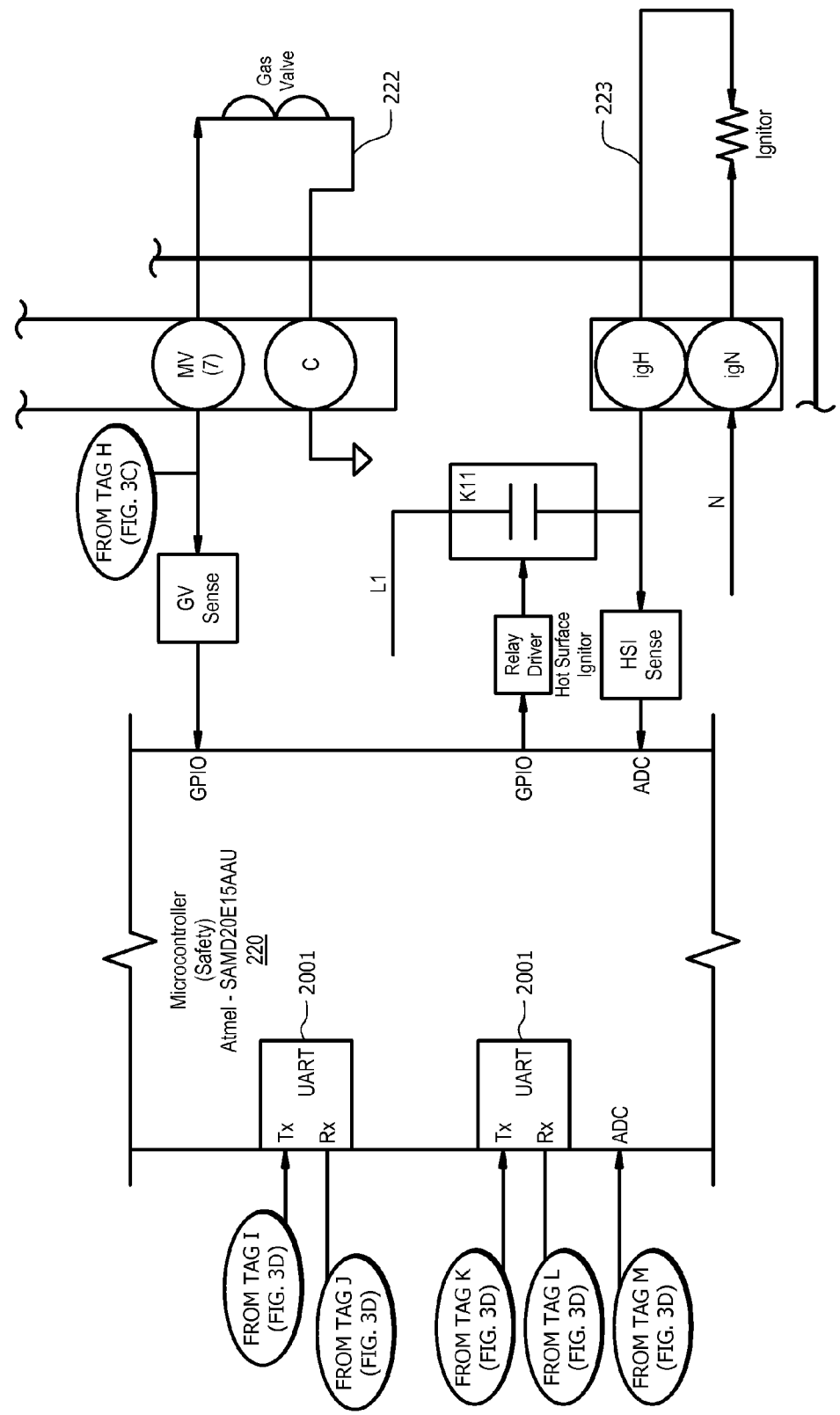
Figure 3F:
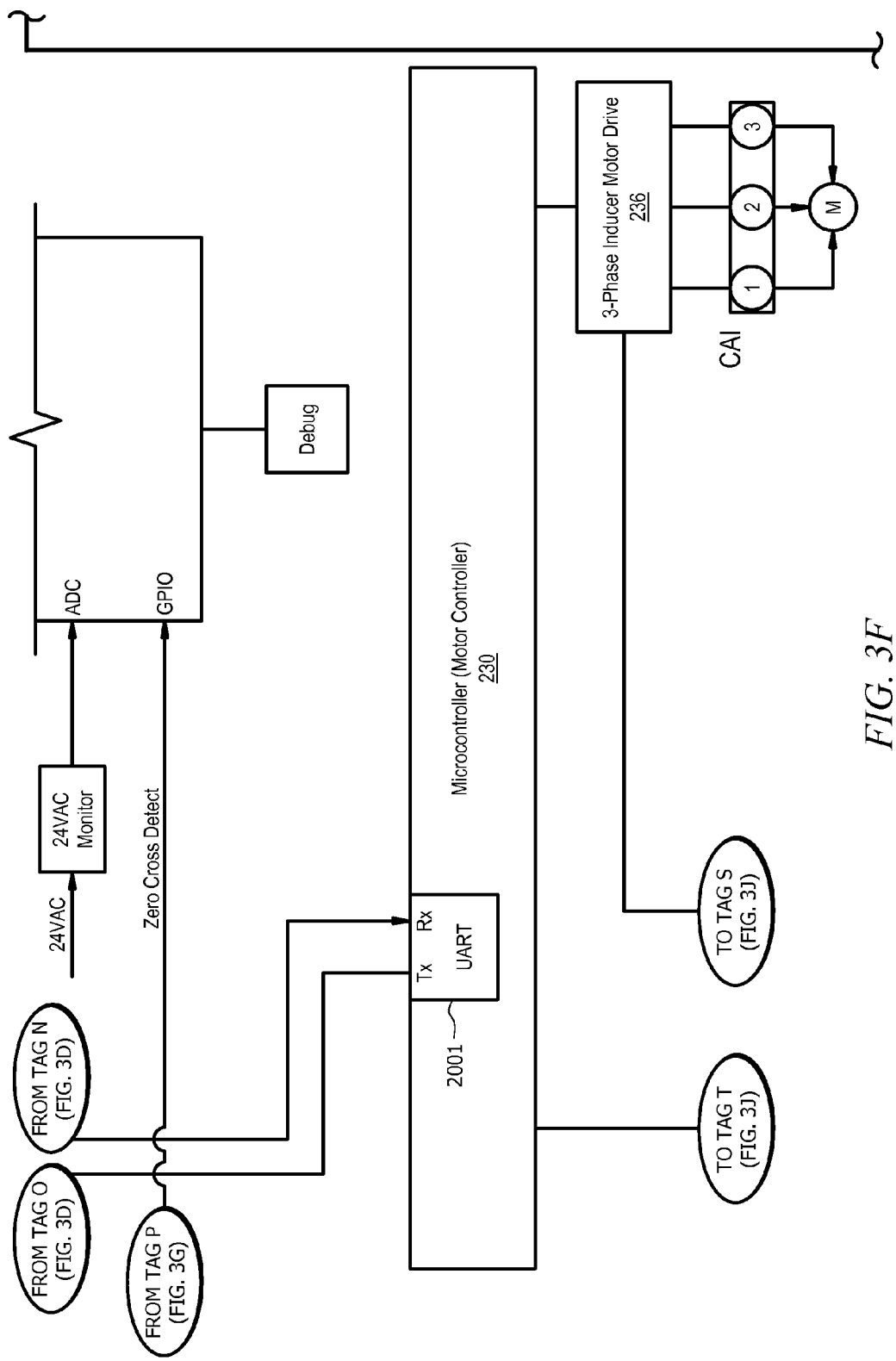
Figure 3G:
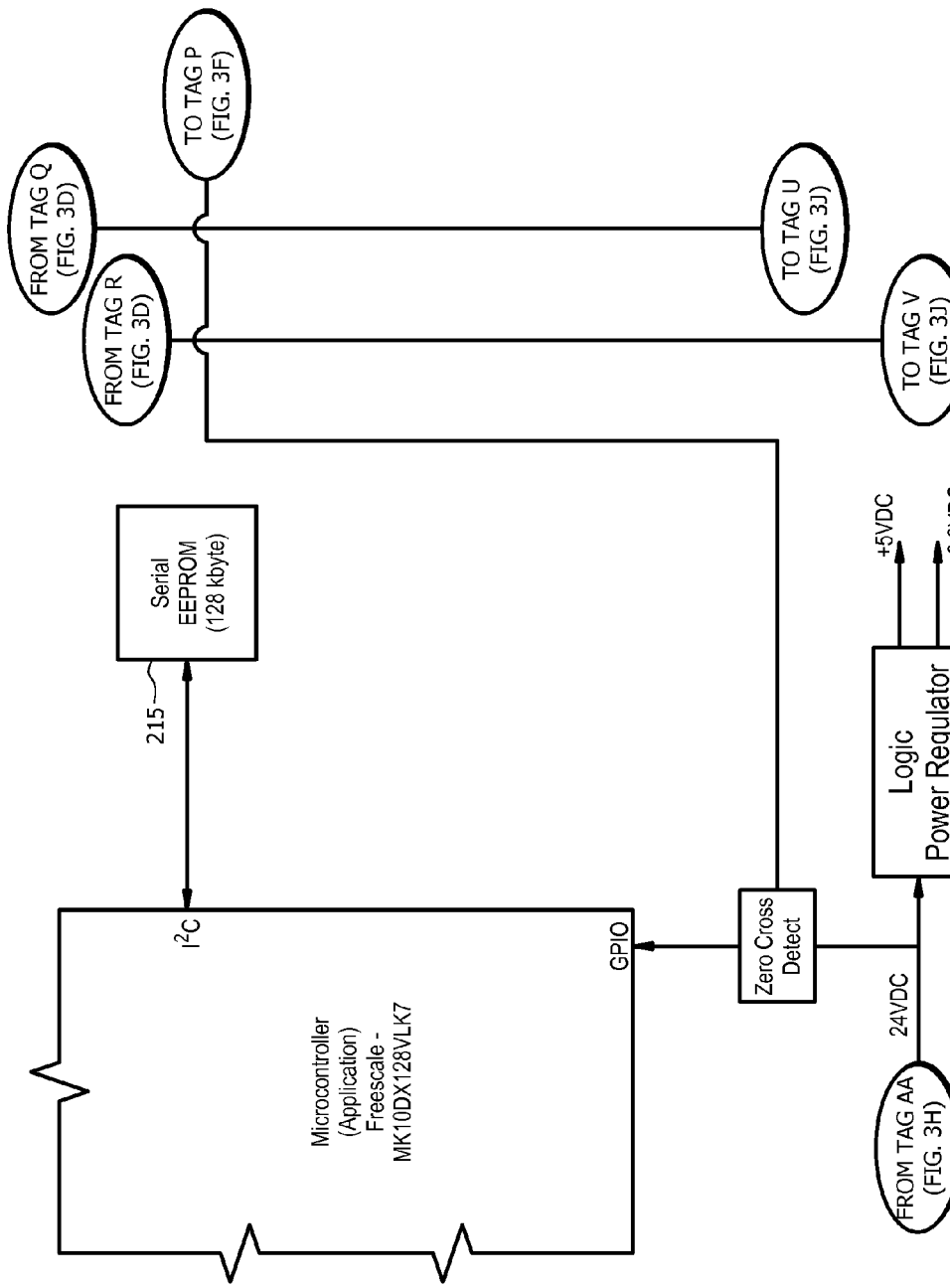
Figure 3H:
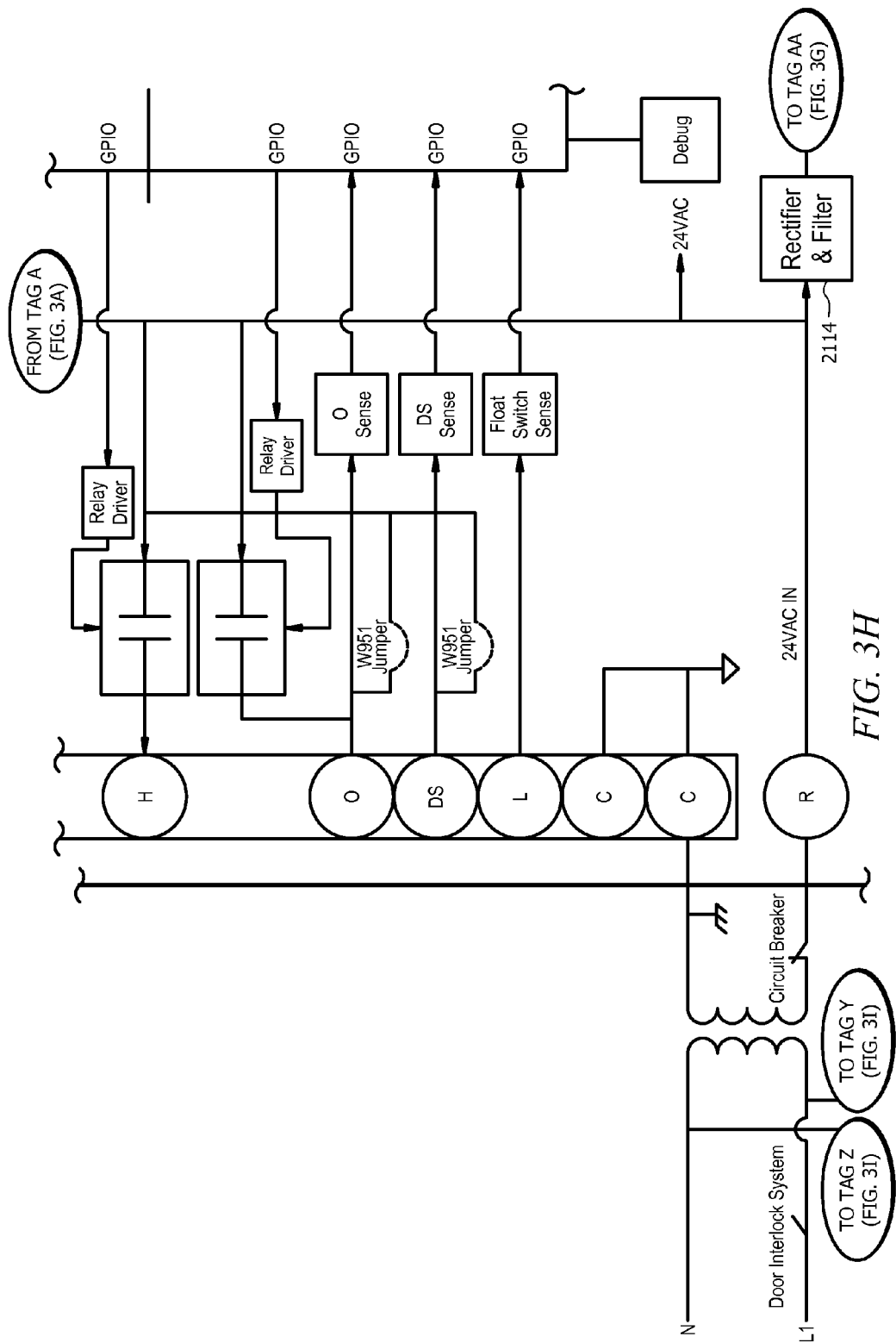
Figure 3I:
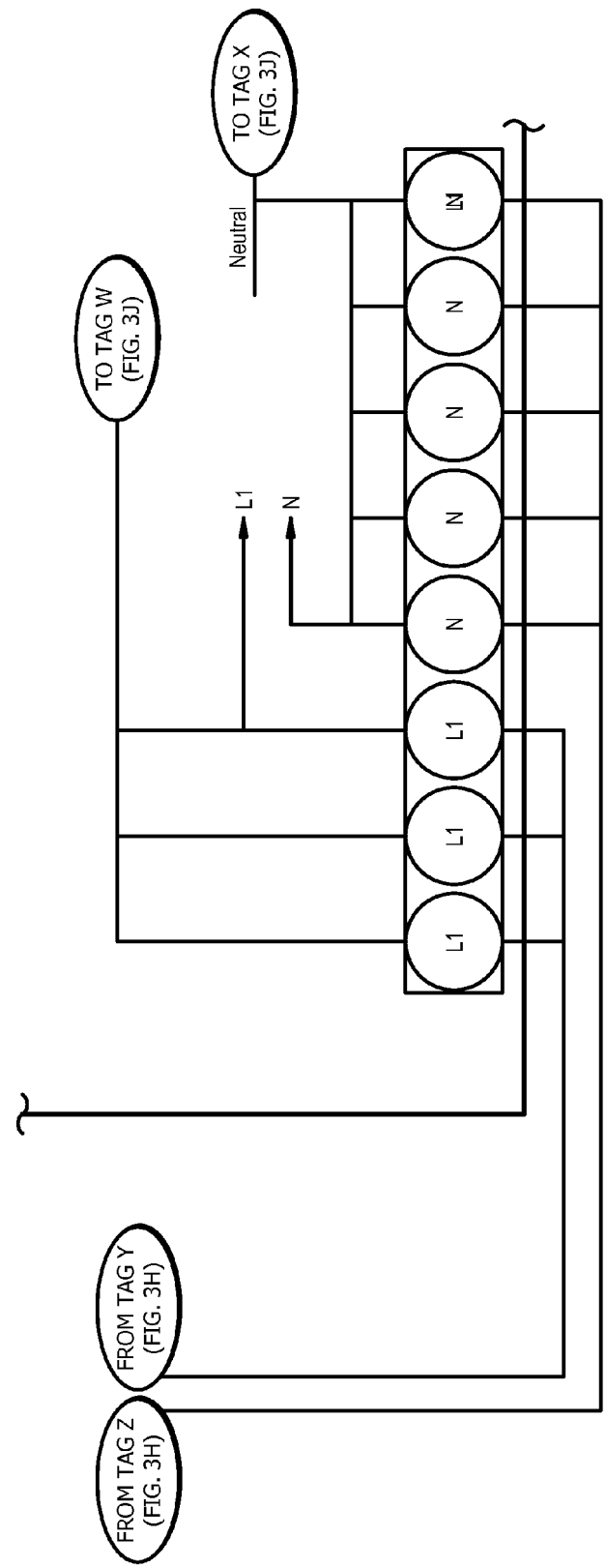
Figure 3J:
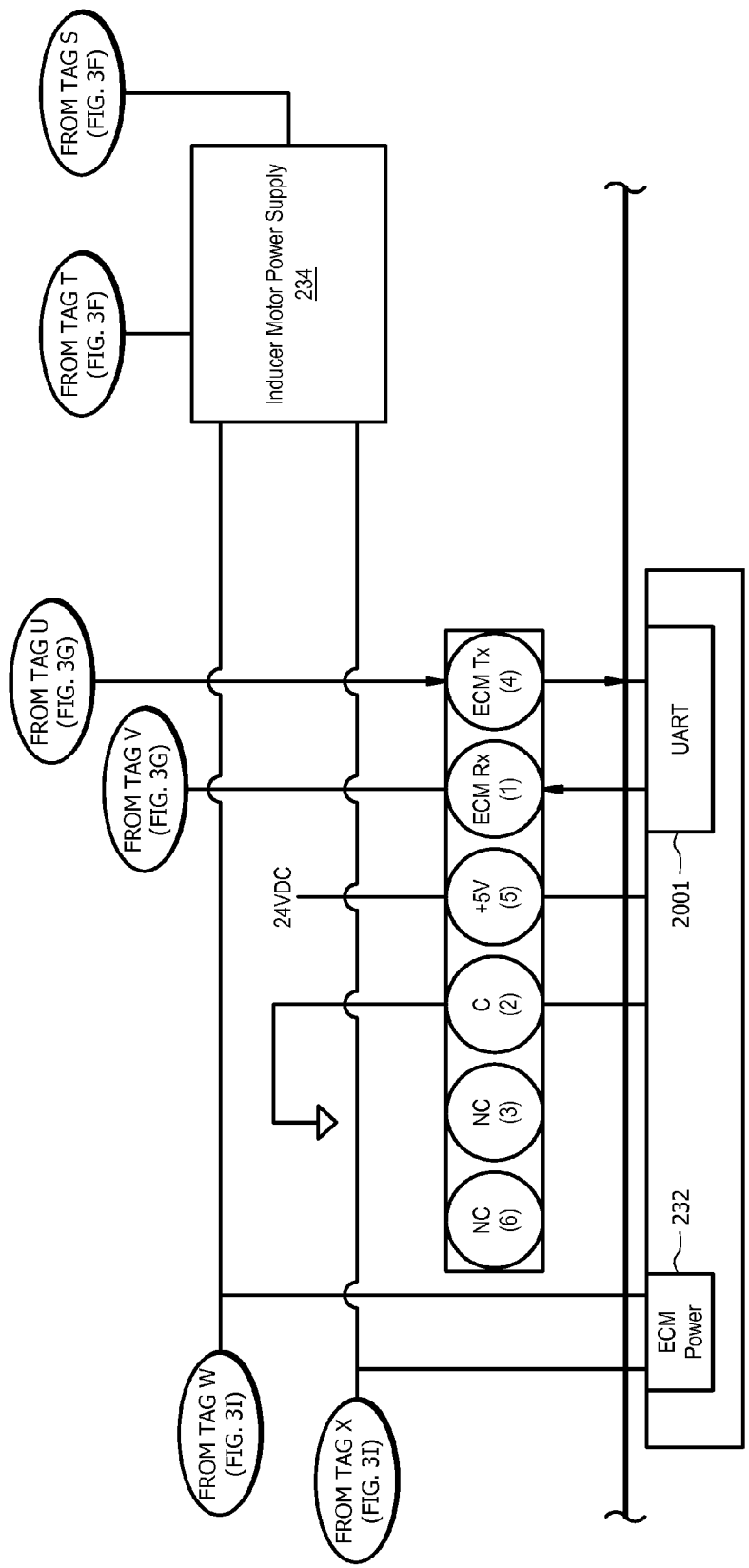

FIG. 3 shows an embodiment under the present teachings of a furnace controller 200. FIGS. 3A-3J shows detailed views of various portions of the embodiment shown in FIG. 3. Elements of FIG. 3 may be visible in the respective detail view of FIGS. 3A-3J as well. Furnace controller 200 comprises an application processor 210, a safety processor 220, and an optional motor controller 230. As can be seen, safety processor 220 manages safety critical functions such as flame sensor 221, gas valve 222, igniter 223, rollout switch 2221, limit switch 2222, high pressure switch 2223, low pressure switch 2224. Application processor 210 controls humidifier 2111, air sensors 2112, thermostat 2113, rectifier and filter 2114, and motor controller 230. Safety processor 220 and application processor 210 communicate over an interprocessor interface 252. Interface 254 connects the application processor 210 and the motor controller 230. Interface 256 connects the safety processor 220 and motor controller 230. In the shown embodiment UART (universal asynchronous receiver/transmitter) interfaces 2001 at each controller help translate instructions being sent and received. In other embodiments other means of communication, translation, and so forth can be used. In FIG. 3 the motor controller 230 comprises ECM (electronically commutated motor) assembly 232, motor power supply 234, and motor drive 236. Application processor 210 and safety processor also comprise memories 215 and 225 respectively.

Safety critical functions should be run through safety processor 220. What functions are safety critical will usually depend on the certifications needed for the controller. If a function is defined, or required, or measured by a certification test or a certification authority, then it is likely that a software update would void the certification. Such functions should therefore be held constant (not updated) when the application processor receives an update. In most embodiments, this will involve at least the flame sensor 221, igniter 223, and the gas valve 222. Other functionalities that will likely be run through the safety processor, but may depend on the embodiment, are hardware interlocks, pressure switches, limit switch, heat exchange monitor, ignition safety, rollout switches, inducer, inducer motor, line voltage, and ground return. The present disclosure can be combined with either modulating, single stage, or double stage gas valves. Examples of non-safety-critical functions, that will be managed by the application processor, can include air sensors, thermostats, humidifiers or other accessories.

Figure 4:
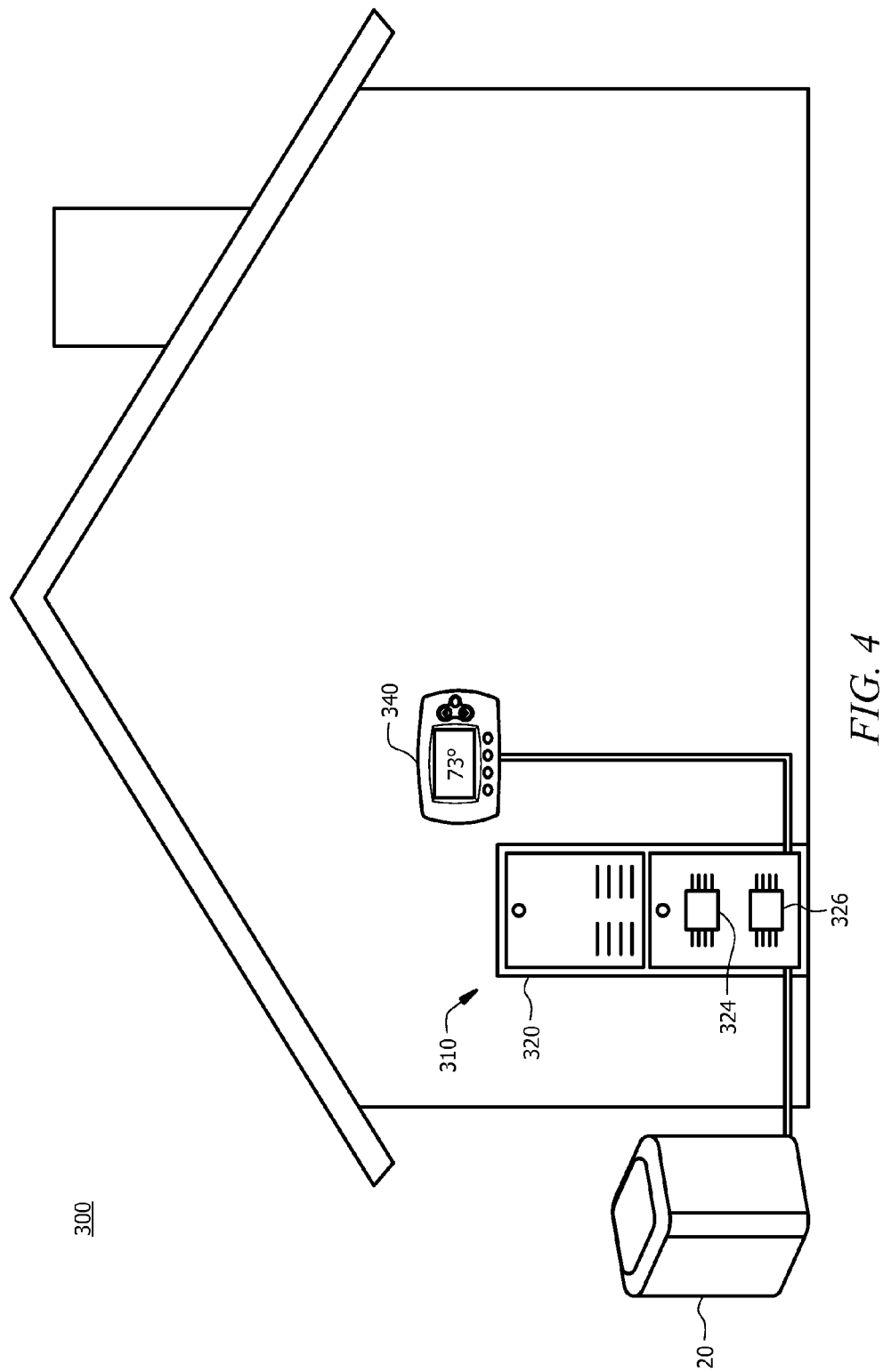
FIG. 4 is a diagram of a system embodiment of the present disclosure.

Another embodiment of the present disclosure can comprise a single controller board, with the functionalities of the central controller and the furnace controller combined into one board. Such an embodiment is shown in system 300 in FIG. 4. System 300 comprises a furnace 310, a controller board 320, a thermostat 340 and an air conditioner (not shown). In this embodiment, controller 320 takes the place of the central and furnace controllers shown in other embodiments. Controller 320 comprises a safety processor 324 and an application processor 326. Safety processor 324 will manage safety-critical functionality and application processor 326 will manage non-safety-critical functions. The safety critical functions will be similar to those described in other embodiments regarding a furnace controller. However, in this embodiment, safety critical functions could include non-furnace related functionalities.

Figure 5:
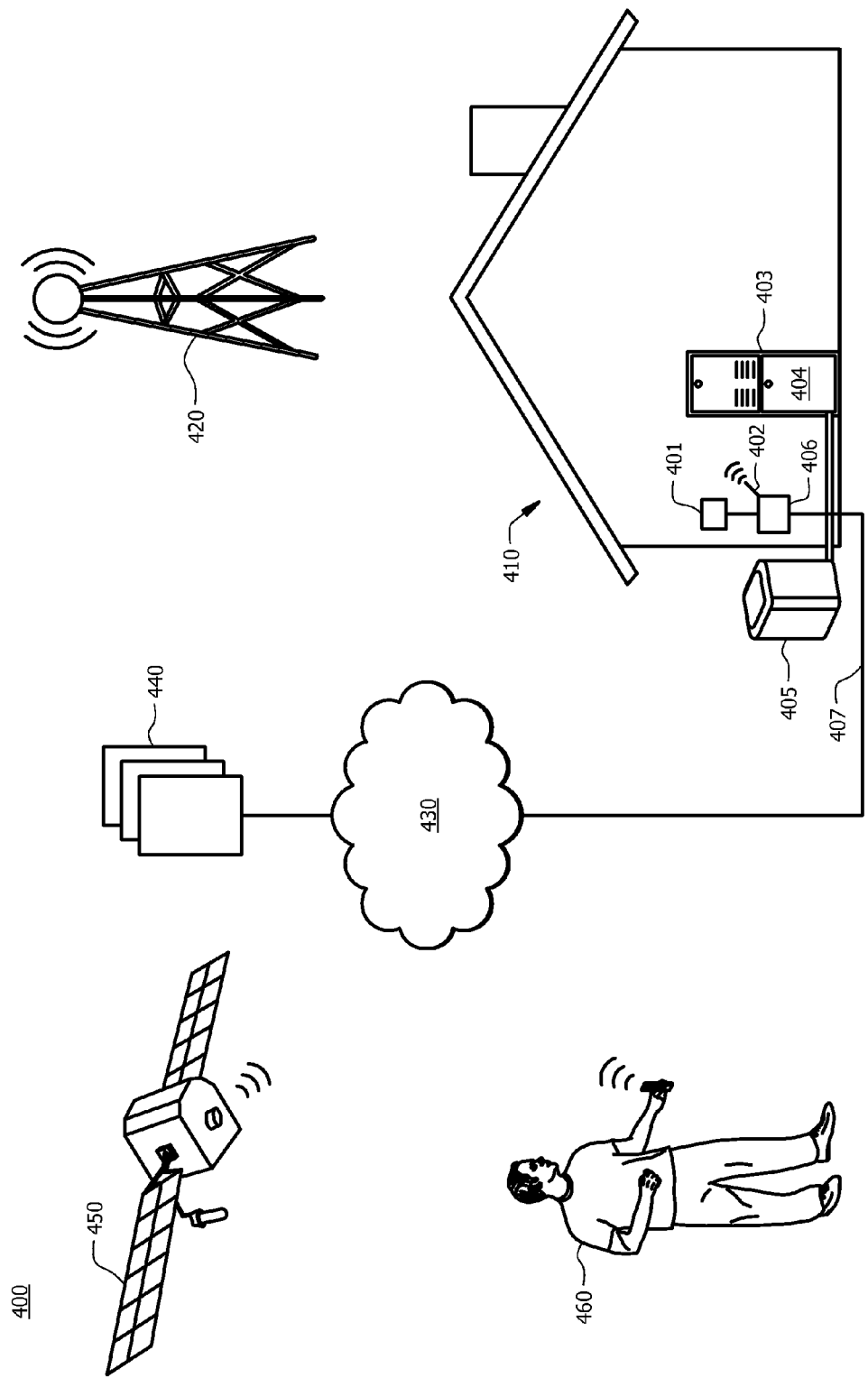
FIG. 5 is a diagram of a system embodiment of the present disclosure.

FIG. 5 shows an embodiment of the present disclosure comprising remote monitoring. System 400 comprises a building 410, cellular network 420, network 430, servers 440, satellite network 450 and remote device 460. Building 410 comprises an HVAC system similar to embodiments described above. Building 410 comprises a thermostat 401, communications interface 402, furnace 403, furnace controller 404 (with an application processor and a safety processor), A/C unit 405, central controller 406, and hardline connection 407. Central controller 406 can communicate with servers 440 via interface 402 (such as cellular or Wi-Fi) or a hardline connection 407. Network 430 can be any type of communication network, such as the Internet. Servers 440 can comprise a monitoring system such as by an HVAC provider and/or monitoring company, or an energy company. Servers 440 can provide monitoring services and can alternatively communicate with a user's device 460 to receive HVAC system commands, such as to set a new temperature. In other possible embodiments remote device 460 can connect directly to central controller 406 to send commands or notifications. Servers 440 can also provide software updates to central controller 406, and thereby also to the application processor of furnace controller 404. If A/C unit 405 had its own independent controller board, then an update could be sent to that as well.

Figure 6:
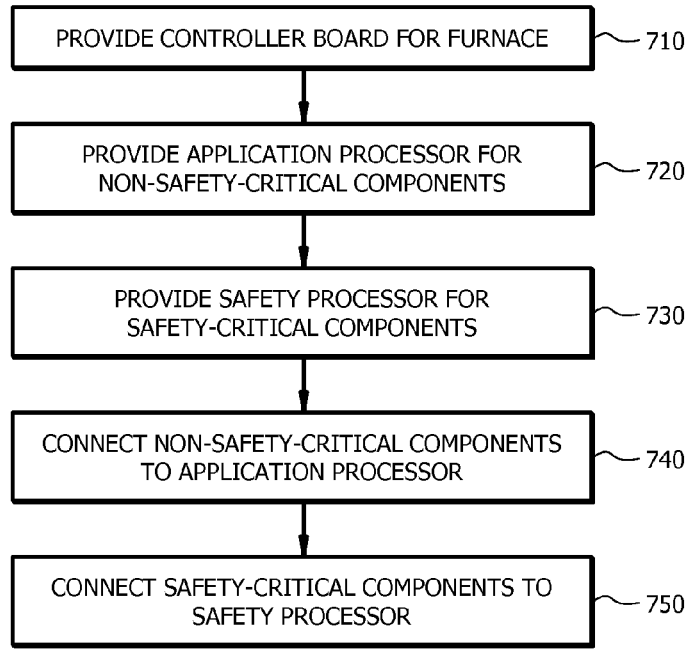
FIG. 6 is a flow-chart diagram of a process embodiment of the present disclosure.

FIG. 6 displays an embodiment of a method 700 of manufacturing a furnace controller board under the present disclosure. A controller board is provided for a furnace 710.

An application processor is provided for non-safety-critical components 720. A safety processor is provided for safety-critical components 730. Non-safety-critical components are connected to the application processor 740. And safety-critical components are connected to the safety processor 750.

Figure 7:
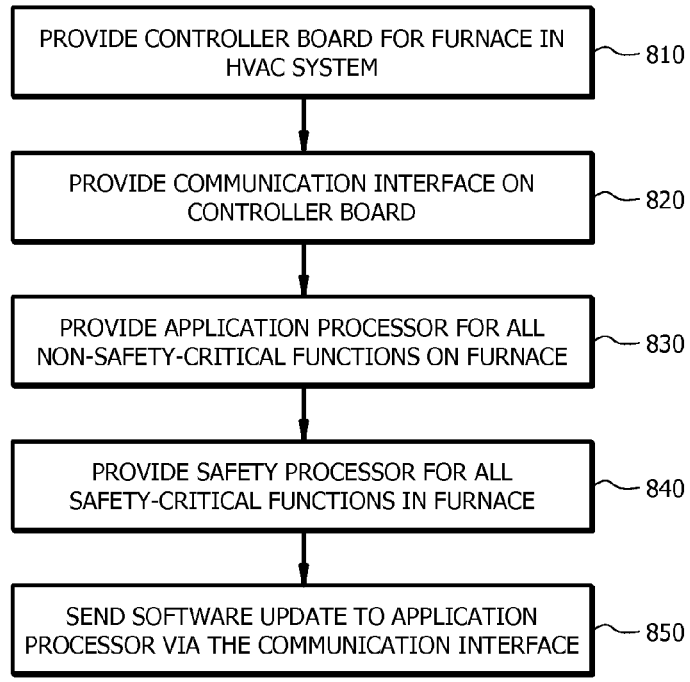
FIG. 7 is a flow-chart diagram of a process embodiment of the present disclosure.

FIG. 7 displays an embodiment of a method 800 of manufacturing and updating a furnace controller 800. A controller board is provided for a furnace in an HVAC system 810. A communication interface is provided on the controller board 820. An application processor is provided for all non-safety-critical functions on furnace 830. A safety processor is provided for all safety-critical functions on furnace 840. A software update is sent to the application processor via the communication interface 850.

Figure 8:
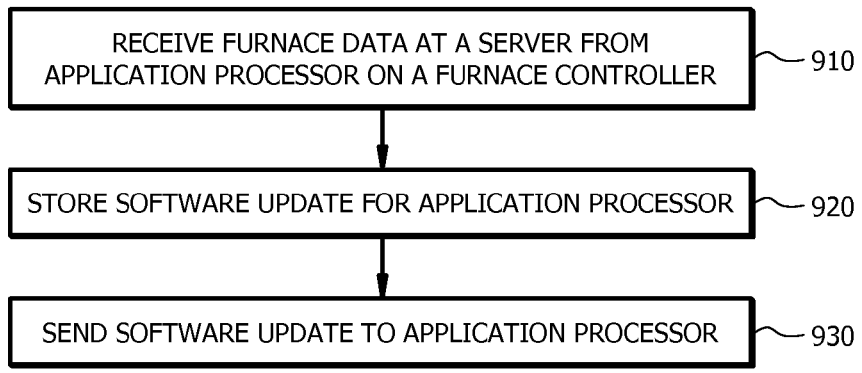
FIG. 8 is a flow-chart diagram of a process embodiment of the present disclosure.

FIG. 8 displays an embodiment of updating software on the application processor 900. Furnace data is received at a server from the application processor on a furnace controller 910. A software update is stored for the application processor of the furnace controller 920. Then the software update is sent to the application processor on the furnace controller 930.

Figure 9:
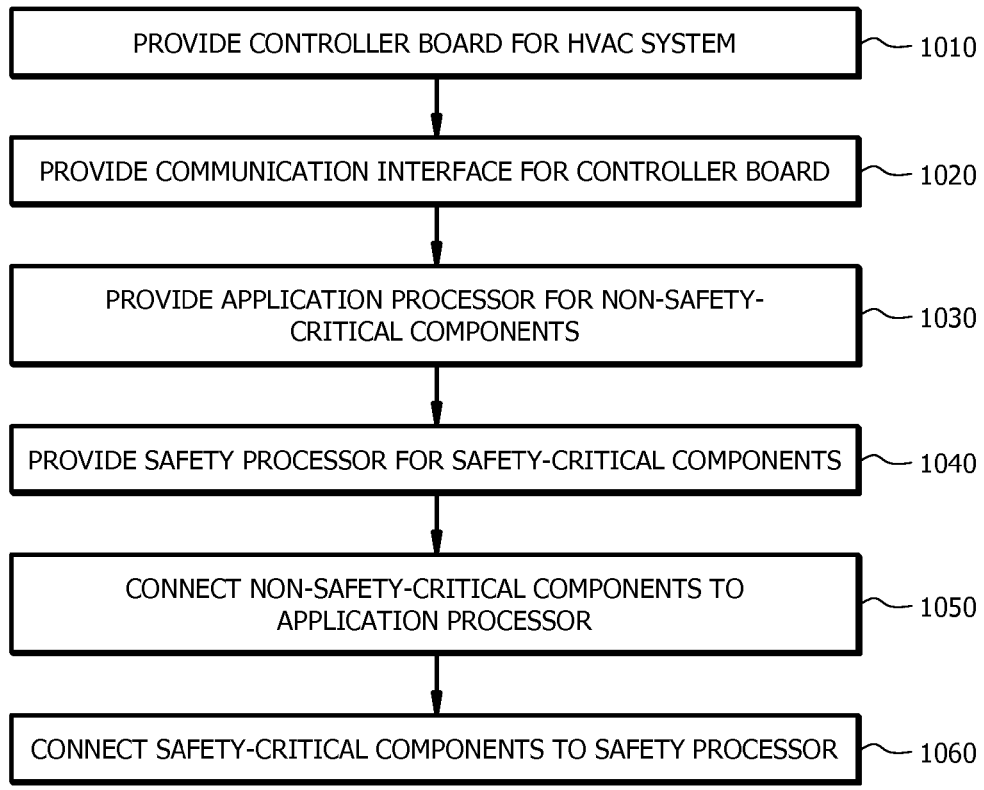
FIG. 9 is a flow-chart diagram of a process embodiment of the present disclosure.

FIG. 9 displays a method for manufacturing a controller for an HVAC system 1000. A controller board is provided 1010. A communication interface is provided for the controller board 1020. An application processor is provided for non-safety-critical components of the HVAC system 1030. A safety processor is provided for safety-critical components of the HVAC system 1040. Non-safety-critical components of the HVAC system are connected to the application processor 1050. Safety-critical components of the HVAC system are connected to the safety processor 1060.

Embodiments of the present disclosure can comprise retrofitted controller boards. For example, a legacy furnace controller (comprising a single processor) could be swapped out for a new furnace controller comprising an application processor and a safety processor such as in the embodiments described above.

Embodiments of the present disclosure can be utilized in commercial, residential, industrial and other settings. Embodiments can comprise multiple furnaces, each with their own furnace controllers. Other embodiments can comprise a single furnace controller connected to a plurality of furnaces.

Furnace controllers and central controllers can comprise various means of connectivity. Controllers can comprise a wireless interface, for example, to connect to a local Wi-Fi or a cellular network, or a hardline connection to a cable, DSL, LAN, etc. Such communication interfaces can provide means by which the application processors are updated. Alternative embodiments of central and furnace controllers can comprise a USB connection for uploading of software updates, if communication interfaces are unavailable or unworkable.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller board for a furnace comprising:
   a communication interface comprising a connection to a central HVAC controller;
   an application processor comprising a memory and a connection to a plurality of non-safety-critical components, the application processor able to process software updates for the non-safety-critical components;
   a safety processor comprising a memory and a connection to a flame sensor, a gas valve, and an igniter, wherein the safety processor and associated software are not updateable; and
   an interprocessor interface comprising a connection between the application processor and the safety processor.

2. The controller board of claim 1 further comprising a motor controller, the motor controller in communication with the application processor and the safety processor.

3. The controller board of claim 1 wherein the application processor and the safety processor both comprise a UART.

4. The controller board of claim 1 wherein the application processor comprises a connection to an air sensor.

5. The controller board of claim 1 further comprising a read-only memory.

6. The controller board of claim 1 wherein the application processor comprises a connection to a humidifier.

7. The controller board of claim 1 wherein the application processor comprises a connection to an HVAC accessory.

8. The controller board of claim 1 wherein the application processor comprises a connection to an air filter.

9. A controller board for an HVAC system comprising:
   a communication interface operable to communicate with a plurality of servers;
   a connection to a thermostat;
   an application processor comprising a memory and operable to receive a software update from the plurality of servers, the application processor further comprising a connection to a plurality of non-safety-critical components, the application processor able to process software updates for the non-safety-critical components;
   a safety processor comprising a memory and a connection to a flame sensor, a gas valve, and an igniter, wherein the safety processor and associated software are not updateable; and
   an interprocessor interface comprising a connection between the application processor and the safety processor.

10. The controller board of claim 9 further comprising a motor controller, the motor controller in communication with the application processor and the safety processor.

11. The controller board of claim 9 wherein the application processor and the safety processor both comprise a UART.

12. The controller board of claim 9 wherein the application processor comprises a connection to an air sensor.

13. The controller board of claim 9 further comprising a read-only memory.

14. The controller board of claim 9 wherein the application processor comprises a connection to a humidifier.

15. The controller board of claim 9 wherein the application processor comprises a connection to an HVAC accessory.

16. The controller board of claim 9 wherein the application processor comprises a connection to an air filter.

17. A method of manufacturing a furnace controller for an HVAC system comprising:
   providing a controller board;
   providing an application processor, the application processor comprising a memory and a connection to a central HVAC controller, the application processor operable to receive a software update;
   providing a safety processor, the safety processor comprising a memory and a connection to a flame sensor, a gas valve, and an igniter; and
   providing an interprocessor interface comprising a connection between the application processor and the safety processor.

18. The method of claim 17 further comprising providing a motor controller.

19. The method of claim 17 wherein the connection to the central HVAC controller is wireless.

20. The method of claim 17 further comprising connecting the application processor to non-safety-critical components of the furnace.

\* \* \* \* \*